(12) United States Patent
Hipp

(10) Patent No.: US 6,970,049 B1
(45) Date of Patent: Nov. 29, 2005

(54) CIRCUIT AND METHOD OF A REFERENCE CLOCK INTERFACE

(75) Inventor: Imre Hipp, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/169,459

(22) PCT Filed: Oct. 31, 2000

(86) PCT No.: PCT/DE00/03839

§ 371 (c)(1),
(2), (4) Date: Jul. 1, 2002

(87) PCT Pub. No.: WO01/50656

PCT Pub. Date: Jul. 12, 2001

(30) Foreign Application Priority Data

Dec. 30, 1999 (DE) .................. 199 63 804

(51) Int. Cl.$^7$ ........................... H03K 5/153

(52) U.S. Cl. ........................... 331/74; 331/175

(58) Field of Search .................. 331/74, 175, 94.1, 331/18; 375/316, 355; 327/168, 304; 370/503, 370/360; 713/500, 503, 600, 601

(56) References Cited

U.S. PATENT DOCUMENTS

| | | | |
|---|---|---|---|
| 4,590,600 A | 5/1986 | Beeman et al. | 375/99 |
| 5,305,315 A | 4/1994 | Lee | 370/84 |
| 5,652,541 A | 7/1997 | Yang et al. | 329/300 |
| 5,896,392 A | 4/1999 | Ono et al. | 371/5.2 |
| 5,952,890 A * | 9/1999 | Fallisgaard et al. | 331/18 |
| 6,580,763 B1 * | 6/2003 | Mullner et al. | 375/316 |

FOREIGN PATENT DOCUMENTS

| | | |
|---|---|---|
| DE | 197 17 643 A1 | 11/1998 |
| EP | 0966117 A1 | 1/1999 |
| WO | WO 99/03241 | 1/1999 |

* cited by examiner

Primary Examiner—Long Nguyen
(74) Attorney, Agent, or Firm—Morrison & Foerster LLP

(57) ABSTRACT

The inventive circuit and corresponding method are used to form a universal referenece cycle interface for any synchronous source, whereby compensation processes and level compensations adaptively occur at decision thresholds.

4 Claims, 5 Drawing Sheets

CIRCUIT AND METHOD OF A REFERENCE CLOCK INTERFACE

CLAIM FOR PRIORITY

This application claims priority to PCT/DE00/03839, published in the German language on Jul. 12, 2001, which claims the benefit of priority to German Application No. 199 63 804.7, filed in the German language on Dec. 30, 1999.

TECHNICAL FIELD OF THE INVENTION

The invention relates to a circuit for generating at least one reference clock.

BACKGROUND OF THE INVENTION

Clock generators, in particular for switching systems, have been built using submodules. In this case, the submodules are each designed for specific reference clock types. With this design, each submodule had only one reference clock interface. Adaptation to a transmission frequency or a cable variant was otherwise achieved by manual setting; a specification of alarm thresholds for level monitoring was achieved by a one-off setting, preferably during production of the submodules.

SUMMARY OF THE INVENTION

The invention discloses a circuit and a corresponding method to form a reference clock interface.

The invention is advantageous since automatic adaptation to the respective reference clock type is performed and since settings for the cable variant are not required.

The invention is also advantageous since different input signals are recognized, and for each input signal an adaptive threshold compensation for sampling the input signal is formed.

A multiplicity of input signals can be used as an input signal, such as an atomic frequency, a PCM24 recovered signal, a PCM30 recovered signal or DS1 in BITS applications, without any further outlay for circuitry and without special settings during production. In one embodiment, it is possible to derive from the input signal at least one first signal for deriving level information and threshold setting for a second signal, which serves at the same time as a trigger signal for the clock generator.

In one aspect, a continuous frequency and continuity monitoring can be performed for both binary and ternary input signal types.

In another aspect, the frequency of the input signal is determined autonomously and parasitic interference effects such as glitches and dropouts are selected.

The invention is also advantageous since with the quantization it is simultaneously possible to determine the jitter tolerance at which the selection of the parasitic interference effects is still ensured.

BRIEF DESCRIPTION OF DRAWINGS

Further features of the invention emerge from the detailed description of the exemplary embodiments below with reference to drawings, in which.

DETAILED DESCRIPTION OF THE INVENTION

According to one embodiment of the invention, there is a universal, compensation-free reference clock interface, in particular for a clock generator in switching systems, which is described below along with a corresponding method.

Figure 1:
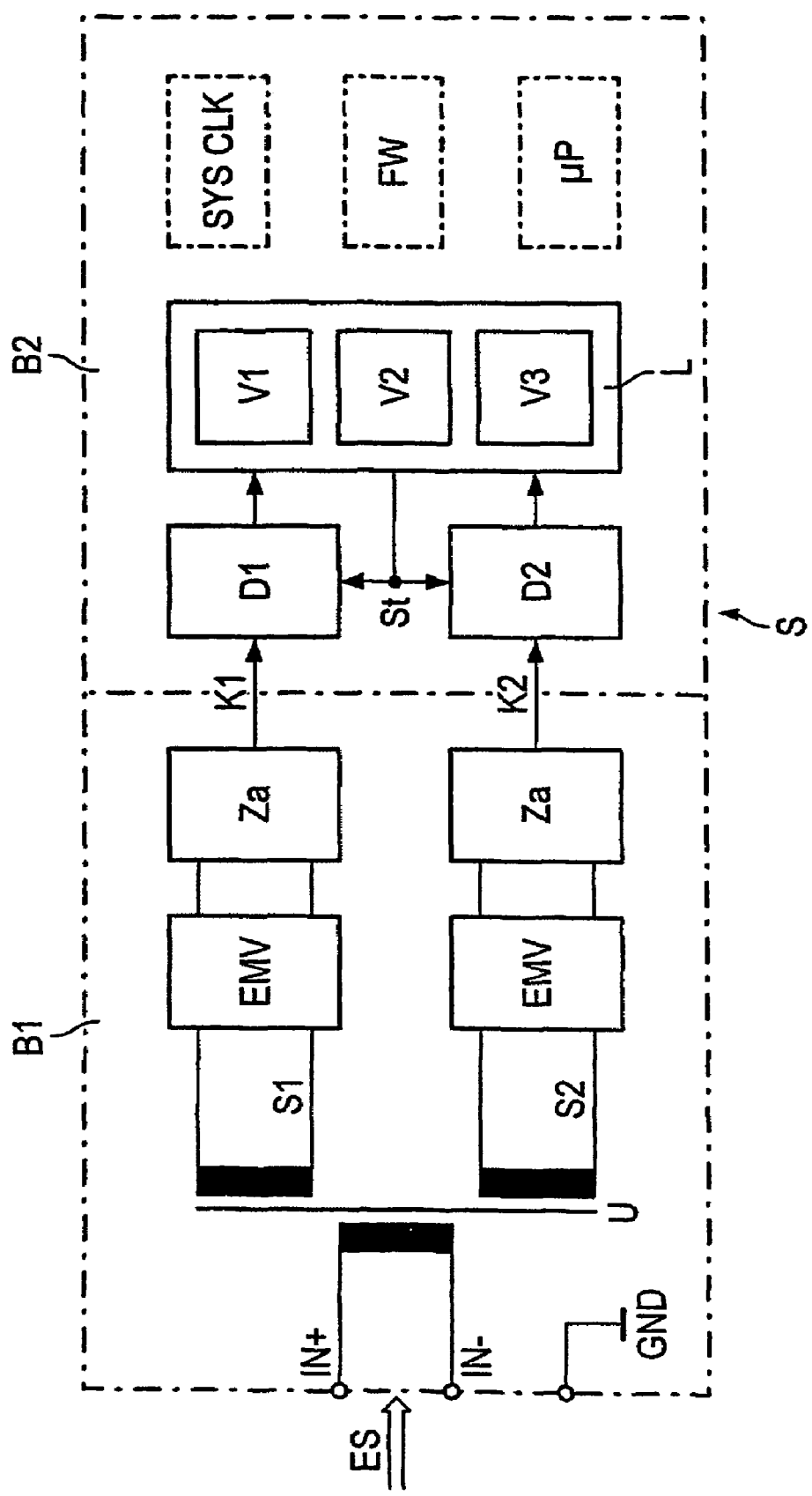
FIG. 1 shows a structure of a reference clock interface.

FIG. 1 shows a structure of a universal reference clock interface having an input IN+/IN−. The block diagram is divided into a first module B1 and a second module B2.

Arranged in the first module B1, a "physical interface", is a transformer U at which the input signal present on the primary side of the transformer U is divided on the secondary side into a first signal S1 and a second signal S2. The signal ES present on the input side of the transformer U may be a reference clock signal for example. A first channel K1, a so-called "level" channel, is fed the first signal S1, and a second channel K2, a so-called "trigger" channel, is fed the second signal S2. The level information (alarm criterion) is captured with the first signal S1; a triggering or sampling of the second signal S2 is performed with the second signal S2 depending on the level information obtained from the first signal S1. On the secondary side of the transformer U is an overvoltage protector EMV and an impedance matching element (Za) in every channel, which together form a terminating impedance for the line connected to the input IN of the circuit.

Provided in the second module B2 are units for determining the required information with respect to the reference clock signal to be sampled and individually provided. The second module B2 can also be designated an adaptive digital system. The analog signals supplied by the first module B1 on the first and second channel K1, K2 are digitized separately in each case in the modules D1 and D2 in the second block B2. Arranged in the modules D1 and D2 is a type of 1-bit analog/digital converter with an adaptively controlled decision threshold. The decision threshold is supplied with control signals, incl. clock signal, from a programmable logic unit L, e.g. a programmable gate array. The programmable logic unit L enables the reference clock signal ES present at the input of the circuit S to be acquired optimally with respect to sampling and monitoring. The criteria obtained from the level information are determined with the aid of a processor subassembly arranged in the second module B2. The processor subassembly is formed by a microprocessor µP and a module FW. A local clock generator SYS CLK makes clock and timing signals available for the reference clock interface. The second module B2 has a logic module L in which are integrated a first processing unit V1 for adaptive level monitoring, a second processing unit V2 for adaptive threshold setting for the first and second signal, and a third processing unit V3 for clock signal adaptation of the input signal ES. A clock signal conditioning corresponding to the type of input signal is performed in the third processing unit V3.

In order to operate the reference clock interface with the different standardized cable variants, an optimized input impedance (cable connection) is determined. When determining the input impedance, it is ensured in accordance with international norm ITU-T G.703 that a return loss of greater than 15 dB is maintained for both existing impedance types 75 and 120 ohm. From that an optimal input resistance of approximately 96 ohm for both impedance types can be derived, thus the return loss for both impedance types is approximately 18 dB. The input resistance of 96 ohm also correlates with the terminating test impedance defined in the American norm (Bellcore GR-499-CORE) of 100 ohm±5% for a DS1 pulse mask in the BITS applications.

It is particularly advantageous to use a broadband transformer U here. When a broadband transformer U is used, the input resistance can be maintained in a wide frequency range, e.g. of 1.5 (10) MHz. It is possible to connect to said circuit application all, for example, input signals of 1 MHz (atomic freq.), 1544 kHz (PCM24 recovered), 2048 kHz (PCM30 recovered), 5/10 MHz (atomic freq.) up to the 1.5 MB/s data signals (DS1 with BITS applications) without any additional configuration outlay.

The cable variants are defined in the cable connector by appropriate wiring of the inputs. Given a symmetrical 120 ohm cable, the two wires are connected to the inputs IN+ and IN−. The cable shielding is contacted to the GND terminal. Given coax cable applications, the signal wire of the coaxial cable is connected to IN+ and the cable shield of the coaxial cable is connected to GND. The inputs IN− and GND are short-circuited in the cable connector.

By virtue of the compatibility achieved, both cable variants can be connected to any reference clock inputs. As a result of a fixed realization of the input resistance, when monitoring the level it is ensured that, owing to the input impedance Rin=95 . . . 96 ohm, the level measured is increased by approximately 11% for 75 ohm applications (with coax cable) and reduced for 120 ohm applications (with symm. cable).

Figure 2:
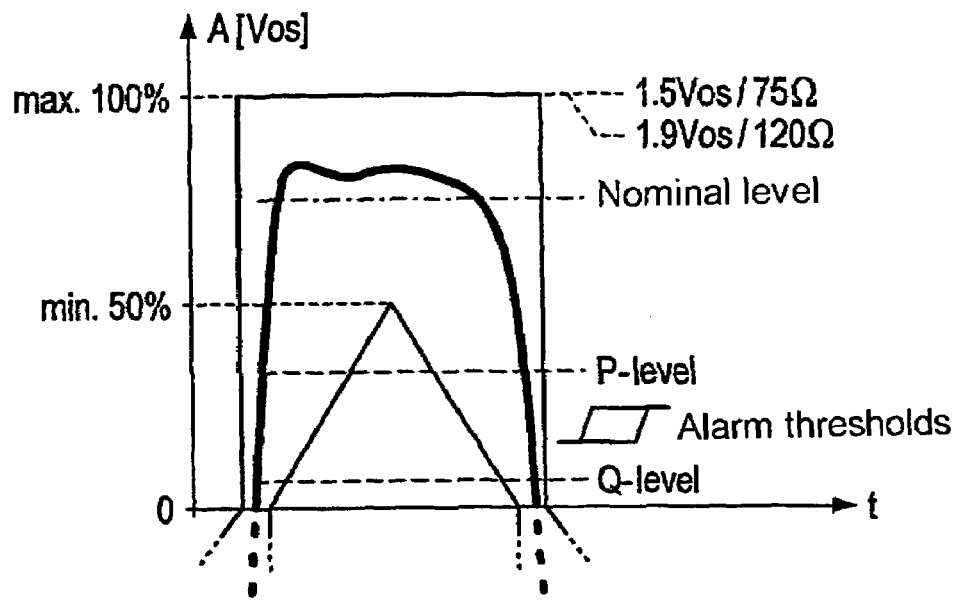
FIG. 2 shows a mask.
Figure 3:
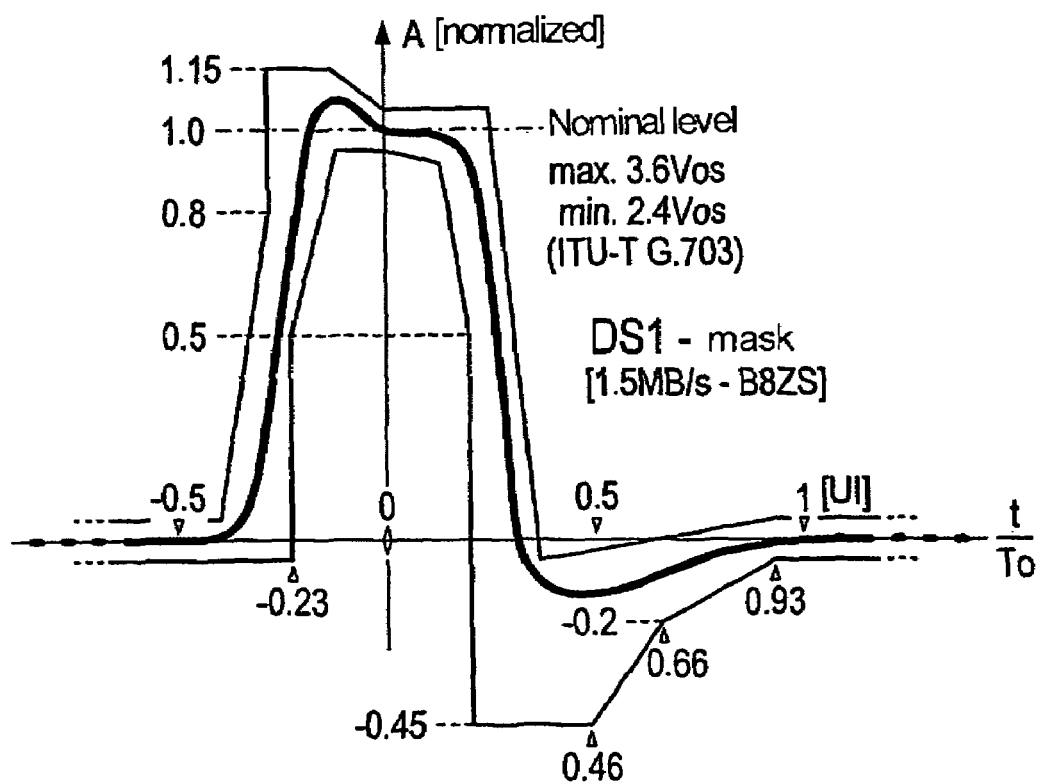
FIG. 3 shows a mask.

The requirements for digitization and the control thereof will be explained with reference to the signal mask shown in FIG. 2 in accordance with ITU-T G.703 for 2048 kHz, and the Bellcore GR-499-CORE signal mask for 1.5 MB/s synchronization signals shown in FIG. 3. To enable comparison of the two masks shown in FIGS. 2 and 3 with one another, only the upper halves of the pulse are represented in each case.

The two systems according to ITU-TG.703 and Bellcore GR-499-Core exhibit fundamental differences. A mask (T3 mask) as shown in FIG. 2 are observed directly at the output of a synchronization source. The mask was designed for a sinusoidal signal or a digital clock signal (two-value signal). A first decision threshold P and a second decision threshold Q for a hysteresis are defined for the level monitoring (alarm detection). The second decision threshold represents an alarm switch-on threshold for a level failure. If the level at the reference clock input falls below the second decision threshold, a loss of signal alarm is triggered and at the same time the second decision threshold is increased to the potential of the first decision threshold P. When the reference clock signal returns, the level alarm is then withdrawn here, and the decision threshold is again lowered to the Q level. There is a sufficient gap (hysteresis) between the levels P and Q in order to ensure the unambiguity of the alarm triggering at all times even in the case where the level is fluctuating and subject to interference. Too great a hysteresis sets the Q level very low. As a result, reference clock signals having too low a level are still accepted, which is disadvantageous since too low a level is prone to interference and in addition causes increased jitter during digitization.

In a building integrated time source BITS system, in contrast to the T3 mask, the pulse mask is controlled at the system input DDF (digital distribution frame), which means that the connection cable is included in the check. Existing systems are designed for cable attenuation up to 6 dB. The criterion for a level failure is defined on the digital side by the evaluation of the spectral density following sampling. This method requires an adaptive comparator compensation (approx. 50% of the present amplitude). As shown in FIG. 3, the mask was designed for a B8ZS coded data signal (ternary signal).

Table 1 shows a summary of the alarm criteria in comparison between the two abovementioned signal types (system). Supplementary thereto, Table 2 shows the norm requirements according to ITU-T G.775 and an actual realization approach with discrete thresholds for both signal types.

TABLE 1

Alarm criteria

| System | Alarm on | Alarm off | Level of evaluation |
|---|---|---|---|
| T3 2048 kHz | Q level not reached For 5 . . . 124 $\mu s$ | P level exceeded For 5 . . . 124 $\mu s$ | Analog |
| BITS 1544 kB/s | Signal density < 12.5% for 65 . . . 162 $\mu s$ | Signal density = 12.5% for 65 . . . 162 $\mu s$ | Digital |

TABLE 2

Alarm thresholds

| System | | Norm requirement | Realization approach |
|---|---|---|---|
| T3 Zo = 75/120Ω | P: Q: | = −9 dB[1] = −35 dB[1] | 0.47 V  −12.6 dB/Zo = 75Ω  −14.8 dB/Zo = 120Ω 0.23 V  −20.8 dB/Zo = 75Ω  −23.0 dB/Zo = 120Ω |
| BITS Zo = 100Ω | | Adaptive: 50% of amplitude value[2] | 0 dB threshold: 1.70 V (4.4 V[3]) −3 dB threshold: 1.15 V (3.4 V[3]) −6 dB threshold: 0.85 V |

[1]Relative to nominal level
[2]The norm does not require any analog-side monitoring
[3]Transition to next lower level With 75 Ω and 120 Ω cable, the limit values P and Q for T3 produce different thresholds because a uniform signal power is assumed for the definition. For this reason the relative norm specifications are given. The fixed thresholds (the same for both impedances) used in the realization approach are well within the permitted limits (see comparison in dB). The mismatch was already taken into account in the conversion with ±1 dB. The hysteresis is approx. 240 mV.

In order to achieve sufficient safety clearance to the interference level, the reference signal is transformed up by 1:2 on the "level" channel. Since the norm specifies the amplitude in Vos, the alarm threshold in V can be simply compared with the associated level in Vss 1:1. The reference signal is transmitted 1:1 and forwarded to the digitization stage on the "trigger" channel. For T3 reference signals the threshold is 0 V (signal center).

In conjunction with a downstream pulse width control, according to the invention the discrete BITS limit values, in this case: 0 dB, −3 dB and −6 dB (relative to the nominal level), satisfy the prerequisites for an optimal bit error-free sampling of the 1.5 MB/s synchronization signals.

The control for the threshold definition for BITS applications is performed in an adaptive manner, such that the amplitude is compared with the threshold 4.4 V on the "level" channel. This measured value corresponds to a level 2.7 dB below the nominal value of 3.0 Vos according to ITU-T G.703. The associated 0 dB trigger threshold is at 1.70 V (approximately 50% of the maximum amplitude of 3.6 Vos. If the level is insufficient, a switch is made to the next lower level value of 3.4 V (corresponds to −5 dB). This includes the −3 dB trigger threshold with 1.15 V (corresponds to approx. 50% of the 0 dB limit with 4.4 V). If the level is still not sufficient, the trigger threshold is lowered to the −6 dB limit with 0.85 V (corresponds to exactly 50% of the −3 dB limit with 3.4 V). The lowest trigger threshold corresponds to an analog side input sensitivity of −11 dB (−9 dB) relative to the nominal level (minimum permitted level). In particular the negative overshoot of the reference signal was taken into account when optimizing the discrete thresholds, so that no sampling of this signal segment can occur at any level value.

A downstream pulse width check is intended to detect and filter out configured signal segments (pre-equalization) and increased cable reflections.

With this method, for example in the case of a ternary BITS signal, the positive pulse halves are detected and the synchronization offered.

Figure 4:
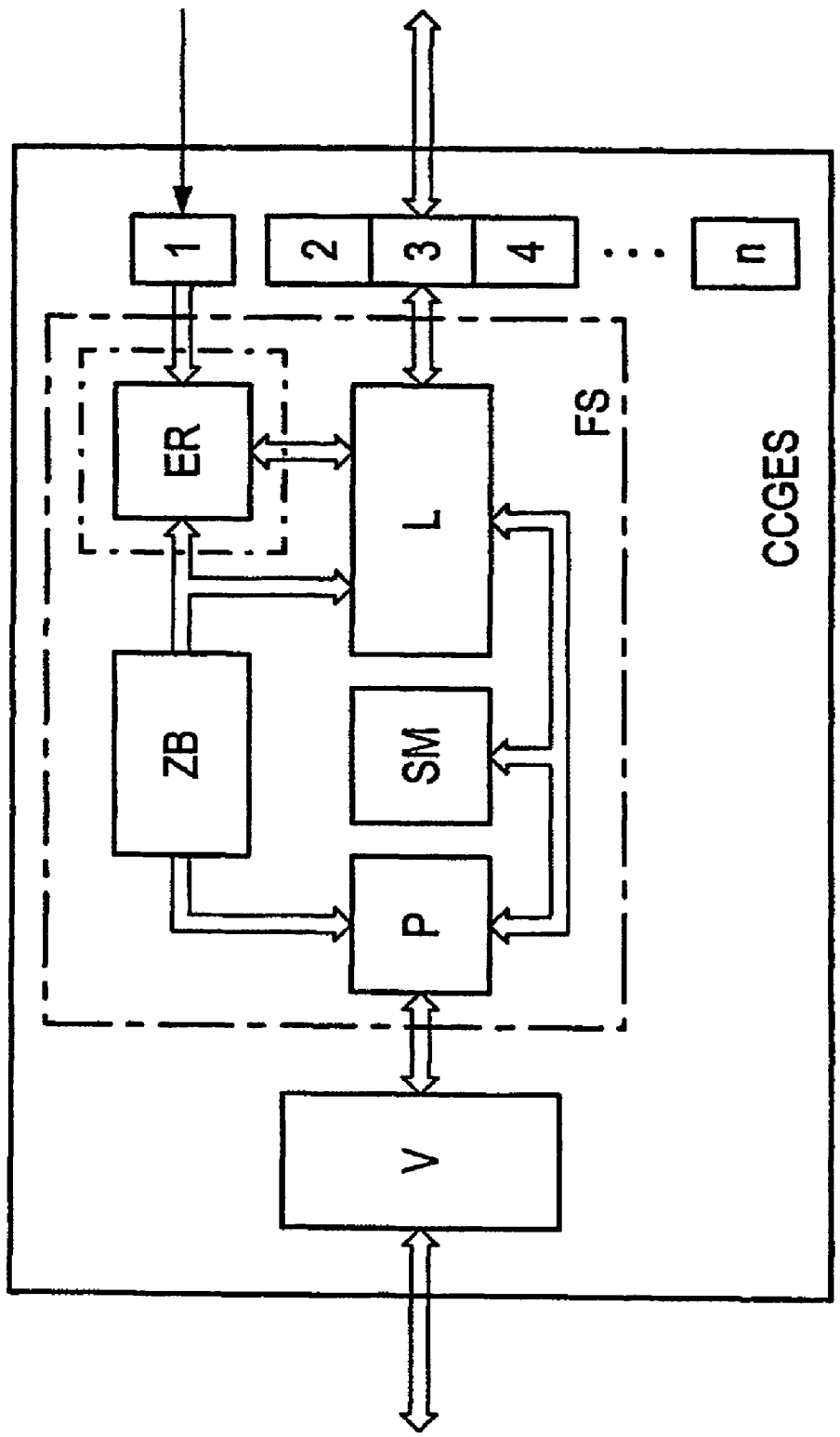
FIG. 4 shows the incorporation of a reference clock interface in a clock generation unit.

FIG. 4 shows an incorporation of a reference clock module ER in a central clock generator CCGES. This representation shows the modules connected to a processor P of the clock generator. In this case, the processor is connected for example via a bus connection to the logic module L and to a storage module SM. A time base unit ZB supplies both the clock pulse for the processor P, the logic module L and the reference clock module ER. The logic module L is connected to a multiplicity of interface units 2 to n. The first interface unit 1 will be explained in greater detail with reference to the figures and the associated descriptions described. With this circuit, the functionality of the circuit of the logic module L, a programmable module, e.g. a field programmable gate array (FPGA), is provided in connection with the processor P.

Figure 5:
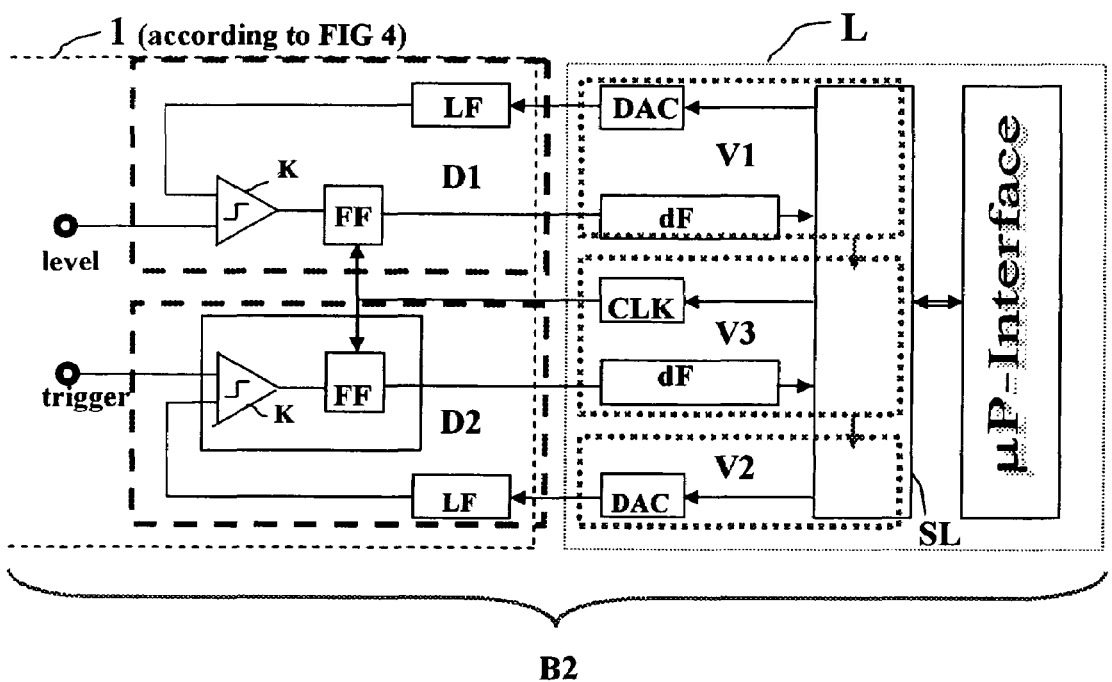
FIG. 5 shows a block diagram.

An interaction of a first or second unit D1, D2 with a programmable logic unit downstream thereof is explained in FIG. 5. The interface between the analog and digital part of the circuit is formed in each case by a comparator K which can be integrated for example in a module with the designation MAX916. In a refinement of the invention, the comparator K, a dual 1-bit analog/digital converter, has a high input sensitivity (approx. 2 mV) as well as a high processing speed of up to 50 MS/s for better processing of the analog signals applied. An extended input voltage range of ±5 V permits use for standardized reference clock signals. A 40 MHz quantization clock already ensures a reliable sampling of reference frequencies between 1 and 10 MHz.

The reference voltages $Uref_{1,2}$ for the first and second signal S1, S2 are supplied by the programmable logic unit L via a low-pass filter LF. The low-pass filter smooths here the voltage jumps coming from the digital/analog converter (threshold switchover) and also the suppression of a.c. voltage components such as noise levels, ripple, etc. The dynamic properties of the low-pass filter LF are determined by the time parameters of the alarm criteria. The time parameters for, for example, a level alarm were set uniformly for both systems (T3 and BITS) to 100 μs. To reach the steady-state condition quickly and at the same time obtain the greatest possible low-pass effect, a short low-pass time constant of approximately 5 μs is selected.

The digital/analog converters DAC are part of the programmable logic unit L. Two methods for analog voltage generation for continuous value control by means of the DC content implemented in the pulse width can be considered here by way of example. With a first method, the value scaling is determined by the height of the quantization frequency. The advantages of this method lie in the increased flexibility of the adaptive threshold control and in the fact that the low-pass filter is controlled via one line. This saves on external components, pins and space.

The second method realized in the exemplary embodiment permits a discrete value control limited to a few values by means of a plurality of static control symbols from the programmable logic unit. According to Table 2, three discrete voltage values per channel (level and trigger) are preferably used to ensure the level detection function for reference clock signals. Two control signals with three possible logic states (L, H and high Z) are required for this. The advantage of this method is that no great demands are placed on the programmable logic unit with respect to the dynamic, and no residual ripple overlays the reference voltage.

The first and second signals supplied by the comparator stage K are subjected to a digital filtering dF to enable a correct evaluation of the digitized analog signals. The circuit according to the invention autonomously determines the frequency of the connected reference clock signals and selects parasitic interference effects such as glitches and dropouts for example. As a result of the quantization, the jitter tolerance at which the selection of the parasitic interference effects still functions reliably is simultaneously determined.

The input frequency is checked and selected in accordance with Table 3 on the basis of the number of 40 MHz quantization clock periods per reference clock period.

TABLE 3

| Reference freq. | 10 MHz | 5 MHz | 2048 kHz | 1544 kHz | 1 MHz | BITS |
|---|---|---|---|---|---|---|
| Number min. | 3 | 7 | 18 | 24 | 38 | 48 |

TABLE 3-continued

| Reference freq. | 10 MHz | 5 MHz | 2048 kHz | 1544 kHz | 1 MHz | BITS |
|---|---|---|---|---|---|---|
| Number nom. | 4 | 8 | 19.5 | 25.9 | 40 | 51.8/77.7[1] |
| Number max. | 5 | 9 | 21 | 28 | 42 | 84 |
| Frequency band | 8.00 ... 13.333 | 4.444 ... 5.714 | 1905 ... 2222 | 1429 ... 1667 | 0.952 ... 1.053 | 1429 ... 1667 kB/s |
| Jitter tolerance | 25 ns | 25 ns | 37 ns | 48 ns | 50 ns | 144 ns |

[1]Frame gap in 1.5 MB/s "all ones" BITS signal

Another function of the digital filtering dF is the checking of the pulse width of the reference clock signals coming from the comparator stage. A spike suppression is performed on the trigger channel and the correct phasing on upper pulse halves of the BITS signals where reflections are present on the cable connection to the reference clock interface.

The control logic SL of the logic module L performs the adaptive threshold control of the comparator stage K via the μP interface by making control signals for generating the reference voltages available to the comparator stage. Furthermore the quantization clock is offered phase-adjusted by the clock block CLK taking account of the propagation delay conditions of the I/O cells.

The forwarding of the digitally filtered reference clock signals ("trigger" channel) and the level measurement signals on the first "level" channel to the μP interface is likewise performed by means of the control logic SL.

The μP interface establishes the connection between the programmable logic unit L and the processor subassembly μP and FW, as shown in FIG. 1. Non time-critical mathematical operations and time measurements are performed by the μP itself. These include the determination of the alarm criteria as well as the coding for adaptive threshold control.

Figure 6:
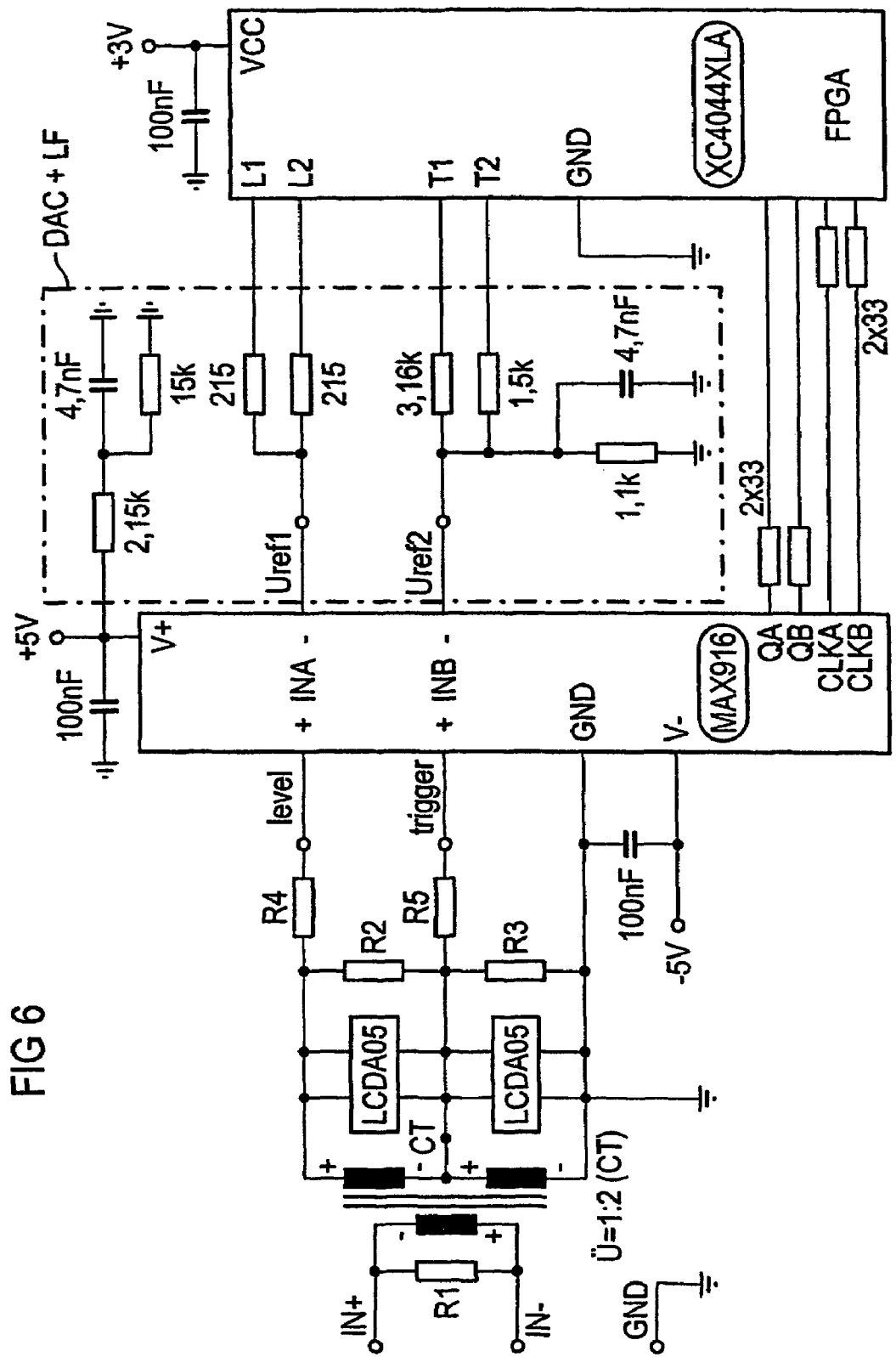
FIG. 6 shows a circuit diagram.

In this development, the universal reference clock interface including four identically structured channels in accordance with the circuit diagram shown in FIG. 6. Shared for four channel's the programmable gate array, e.g. FPGA: XC4044XLA which, apart from the interface functions, combines in itself all time-critical HW components of the central clock generator CCGES.

Connected to the control outputs L1,2 and T1,2 is a simple DAC (digital/analog converter) including low-pass filter (LF) comprised of RC components. The low-pass effect at the outputs Uref1 and Uref2 is variable due to the control with 3-value code. Matched to the norm requirements, the code-dependent time constants lie in the range of 0.5 ... 10 μs. The coding with the assignment to the various thresholds is shown in Table 4.

TABLE 4

Coding of the threshold control realized in FIG. 6

| | | Level comparator | | | Trigger comparator | | |
|---|---|---|---|---|---|---|---|
| System | Designation | L1 | L2 | $U_{ref1}$ | T1 | T2 | $U_{ref2}$ |
| T3 | P | L | Z | 0.47 V | L | L | 0 V |
| | Q | L | L | 0.23 V | L | L | 0 V |
| BITS | 0 dB | Z | Z | 4.4 V | H | H | 1.70 V |
| | −3 dB | H | H | 3.4 V | L | H | 1.15 V |
| | −6 dB | — | — | — | H | Z | 0.85 V |

The comparator K is operated with 30 5 V supply voltage. The digital inputs and outputs ($CLK_{A,B}$ and $Q_{A,B}$) work with TTL level so that a direct connection to the first module in LV-CMOS with 3.3 V is possible without level adaption. The connection lines are HF-matched serially by means of resistors, for example 33 ohm. The high-resistance analog inputs of the MAX916 (level and trigger) are protected against overvoltage peaks by the resistors R4, R5 with 330 ohm resistance each, since the internal clamp diodes allow limited current peaks.

The two resistors R2, R3, for example 215 ohm, together with a resistor R1, for example 1 kohm, (directly at their input) realize the optimal impedance matching (Za, FIG. 1) of the reference clock inputs for 95.96 ohm. The two LCDA05 modules from the firm of Semtech ensure sufficient overvoltage protection (ESD, EFT) with the aid of integrated suppressor diodes (TVS array). Owing to the integration of serial Schottky diodes in this chip, a very low load capacitance is achieved, which significantly improves the HF properties of the reference clock interfaces.

The last module is the interface transformer T1068 from the firm of Pulse. This octal toroidal core transformer in SMD assembly technology has been specifically developed for the 1.5 MB/s and 2 MB/s data rate. It includes four transformers with ü=1:1 (CT) and four with ü=1:2 (CT). Owing to the excellent HF properties up to about 5 MHz, the four up-transforming transformers are ideally suited for use in the reference clock inputs. The function can be extended to 10 MHz, in which case a worsening of the input reflection by up to 6 dB is accepted.

What is claimed is:

1. A circuit for generating at least one reference clock, comprising:
   a first module to form a physical interface, with at least one of a first and second signal being formed from an input signal present at the input of the first module;
   a second module to monitor the first signal and to determine adaptation parameters for a sampling of the second signal, wherein
   the first module has a transformer by means of which the input signal present at its primary winding is divided on the secondary side into the first and second signal, and the second module has a first processing unit for adaptive level monitoring, a second processing unit for adaptive threshold setting for the first and second signal, and a third processing unit for clock signal adaptation of the input signal.

2. The circuit as claimed in claim 1, wherein a corresponding clock signal conditioning is performed by the third processing unit, depending on the input signal.

3. A method for generating at least one reference clock, comprising:
   forming a physical interface in a first module, with at least one of a first and second signal being formed from an input signal present at the input of the first module;
   monitoring the first signal and determining the adaptation parameters for an optimal sampling of the second signal in a second module, wherein
   the first and second signals are formed from the input signal in the first module, such that an adaptive level monitoring of the input signal is performed in the second module, an adaptive threshold setting for the first and second signal is performed, and a clock signal adaptation of the input signal is performed.

4. The method as claimed in claim 3, wherein a corresponding clock signal conditioning is performed depending on the input signal.

* * * * *